(12) United States Patent
Gnandt

(10) Patent No.: US 6,575,056 B1
(45) Date of Patent: Jun. 10, 2003

(54) DUAL LAYSHAFT TRANSMISSION

(75) Inventor: Thomas Gnandt, Horgenzell (DE)

(73) Assignee: ZF Friedrichshaften AG, Friedrichshaften (DE)

( * ) Notice: Subject to any disclaimer, the term of this patent is extended or adjusted under 35 U.S.C. 154(b) by 0 days.

(21) Appl. No.: 10/009,252

(22) PCT Filed: May 8, 2000

(86) PCT No.: PCT/EP00/04100

§ 371 (c)(1),
(2), (4) Date: Oct. 25, 2001

(87) PCT Pub. No.: WO00/70239

PCT Pub. Date: Nov. 23, 2000

(30) Foreign Application Priority Data

May 12, 1999 (DE) .......................................... 199 22 116

(51) Int. Cl.[7] ............................................... F16H 37/06
(52) U.S. Cl. .................. 74/665 GA; 74/331; 74/665 R; 74/13; 74/15.86
(58) Field of Search .......................... 74/665 R, 665 F, 74/665 G, 665 GA, 606 R, 331, 11, 13, 15.4, 15.6, 15.63, 15.69, 15.82, 15.84, 15.86, 15.66

(56) References Cited

U.S. PATENT DOCUMENTS

| | | | | |
|---|---|---|---|---|
| 2,168,033 A | * | 8/1939 | Johnston et al. | ....... 74/15.63 X |
| 2,743,615 A | * | 5/1956 | Keese | ....................... 74/15.63 |
| 2,975,656 A | * | 3/1961 | Haverlender | ........... 74/15.84 X |
| 4,215,586 A | * | 8/1980 | Morris, Sr. | ............... 74/15.4 X |
| 4,388,838 A | | 6/1983 | Richards et al. | .............. 74/331 |
| 4,856,355 A | * | 8/1989 | Ishimaru | .................. 74/15.4 X |
| 5,339,703 A | * | 8/1994 | Tanaka | ........................ 74/15.4 |
| 6,314,827 B1 | * | 11/2001 | Matsufuji | ............. 74/15.86 X |

FOREIGN PATENT DOCUMENTS

| | | | | |
|---|---|---|---|---|
| DE | 1 102 570 | | 9/1961 | ............ B62D/8/40 |
| DE | 31 47 853 A1 | | 6/1983 | ........... F16H/57/02 |
| EP | 0 043 443 A2 | | 1/1982 | ............. F16H/3/08 |
| EP | 0 052 814 B1 | | 6/1982 | ............. F16H/5/36 |
| EP | 0 683 873 B1 | | 11/1995 | ........... F16H/3/095 |
| EP | 0 816 715 A1 | | 1/1998 | ........... F16H/3/095 |
| JP | 357090456 | * | 6/1982 | ................ 74/15.63 |
| JP | 361041624 | * | 2/1986 | ................ 74/15.63 |

\* cited by examiner

Primary Examiner—Charles A. Marmor
Assistant Examiner—Ha Ho
(74) Attorney, Agent, or Firm—Davis & Bufold, P.L.L.C.

(57) ABSTRACT

The dual layshaft transmission with load compensation has one axially and radially mounted drive shaft, one main shaft mounted coaxially thereto which is connected via a PTO-shaft with an output shaft for the PTO-operation and two layshafts, there being situated between the two layshafts one gear which upon application of a load automatically centers itself upon the two layshafts. Upon the PTO-shaft (2) is additionally situated at PTO-wheel (3) which meshes with a main shaft wheel (4) disposed upon the main shaft and is driven thereby.

3 Claims, 3 Drawing Sheets

DUAL LAYSHAFT TRANSMISSION

FIELD OF THE INVENTION

The invention relates to a dual layshaft transmission with load compensation for motor vehicles and having an axially and radially mounted drive shaft, one main shaft mounted coaxially thereto and connected via a PTO-shaft with an output shaft and two layshafts.

BACKGROUND OF THE INVENTION

In transmissions of this kind having at least two layshafts, the load compensation is generally designed so that the drive shaft and the layshafts are rigidly supported relative to the housing while the main shaft (or output shaft) is floatingly supported in the summation wheels disposed upon it which are located in the power flow.

EP-A 43443, for ex., thus describes a power distribution among several layshafts having a radially and axially mounted drive shaft. An input pinion provided upon the drive shaft passes the torque on the gears meshing therewith and firmly connected with the layshafts. Said gears pass on the torque to idler wheels disposed upon the output shaft axially fixed and radially freely movably and by means of a respectively associated clutch system to the output shaft. Said output shaft is here floatingly supported coaxially to the drive shaft.

When there are two or more constants, the problem then arises that with several drive wheels that the non-shifted drive wheel needs radial play due to manufacturing tolerances. When a torque is reduced on a layshaft radial and axial forces generate on a helically geared meshing of teeth on the drive shaft. To be able to absorb these, the gear located in the power flow has to be guided to the drive shaft.

Layshaft transmissions are generally designed so that the drive shaft is fixedly guided radially and axially while the main shaft (that is, the output shaft), due to the required load compensation, is radially free and only axially fixed. For a working load compensation all idler wheels are axially fixed but radially free upon the drive shaft and upon the output shaft.

However, the needed load compensation is disturbed when an asymmetric force occurs. This is the case, for example, when a PTO takes place via one layshaft only.

To develop a dual layshaft transmission in the sense that an asymmetric force by also possible, especially one in which a PTO does take place via only one layshaft, it has been proposed in the applicant's EP 68387 that at least one input pinion provided upon the input shaft be an axially fixed and radially freely movable idle wheel which for torque transmission is coupled via a shifting system with the drive shaft and via a movable fixing device is radially locked. By means of said radial locking or centering of the input pinion situated upon the drive shaft, an asymmetric force invasion or a one-sided output via a layshaft is possible without the operating capacity of the toothed gear change transmission being impaired. Since in general two drive gears are available, but always only the shifted input pinion has to be radially fixed for an operating capacity, the other input pinion remains radially free.

A dual layshaft transmission with this feature of load compensation in which, therefore, one gear is situated between the two layshafts axially fixed with very great radial play, which upon application of a load automatically centers itself between the two gears of the layshafts, has been manufactured and offered by the applicant under the name "Astronic". In this known transmission, during PTO-operation, the constant is at that time connected centered, that is, radially fixed, upon the drive shaft in order that the load compensation is not disturbed by the one-sided torque reduction, that is, on only one of the layshafts.

SUMMARY OF THE INVENTION

The problem on which this invention is based is to provide a dual layshaft transmission which makes the reduction of a torque for the PTO-operation possible without disturbing the load compensation of the gear between the two layshafts so that the PTO-operation is no longer dependent on the shifted gear and the centering of the constant can be eliminated.

It is therefore proposed according to the invention that the PTO-shaft used be driven by its own gear, the PTO-wheel, via a main shaft wheel, the radial force between PTO-wheel and main shaft wheel being absorbed by a plate mounted on the PTO-shaft and on the main shaft wheel. It is here of the essence that the support be between the main shaft wheel and the plate and not between the main shaft and the plate. Thereby the main shaft remains free and like formerly can center itself also when the other main shaft wheels are shifted.

The tangential force on the PTO-wheel generates a component which is absorbed by the bearing between the plate and the PTO-shaft. In order that as result of the occurring tangential force the plate does not move with the PTO-wheel and the PTO-shaft relative to the main shaft wheel, the plate is advantageously retained by brackets situated on the housing.

The PTO-shaft is supported on the housing in a bearing which allows a certain wobbling motion. Said wobbling motion must also be ensured in the connection of the PTO-shaft with the transmission housing and the shaft by the PTO proper. Thereby the PTO-shaft has a behavior similar to that of a prop shaft which transmits a torque and yet has a certain clearance motion space.

The PTO-shaft, the PTO-wheel, the plate and the main shaft wheel form a unit which can move with relative freedom due to the PTO-shaft support and the brackets. It is thus made possible to the main shaft wheel to center itself between the layshafts despite a reduction of a torque for the PTO.

The centering of the constants is therefore, eliminated with the inventive development of the dual layshaft transmission; the PTO-operation is thereby independent of the gear shifted.

BRIEF DESCRIPTION OF THE DRAWINGS

The invention is explained in detail herebelow with reference to the drawings in which an advantageous embodiment is shown. In the drawing.

DETAILED DESCRIPTION OF THE INVENTION

Figure 1:
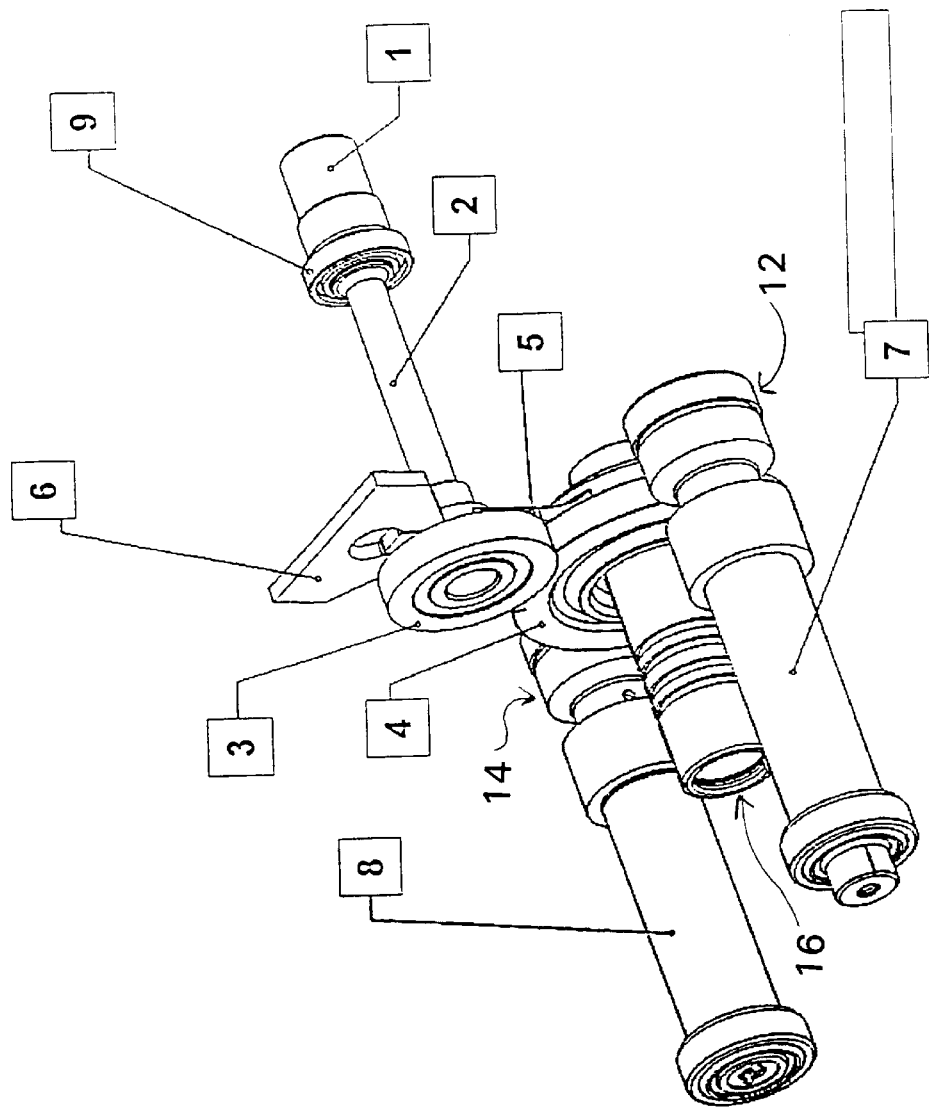
FIG. 1 diagrammatically shows one part of the inventive dual layshaft transmission.

Dual layshaft transmissions with load compensation are basically known to the expert, the same as the manner of operation thereof; thus, only the parts essential to understanding of the invention will be shown and described herebelow.

In the figures, where the same parts are provided with the same reference numerals, 1 means the connection of the dual layshaft transmission to the PTO, 2 the PTO-shaft, 3 the PTO-wheel, 4 the main shaft wheel, 5 a plate, 6 a bracket, 7 the first layshaft, 8 the second layshaft, 9 the PTO-shaft bearing, 10 the bearing between the plate 5 and the PTO-shaft 2, 11 a bearing between the plate 5 and the main shaft wheel 4, 12 the first layshaft gear wheel and 14 the second layshaft gear wheel.

The additional PTO-wheel 3 placed upon the PTO-shaft 2 meshes with the main shaft wheel 4 placed upon the main shaft 16 and is driven thereby. Between the PTO-wheel 3 and the main shaft wheel 4 is provided a plate 5 which is supported on one side on the PTO-shaft 2 and on the other side on the main shaft wheel 4. Said plate 5 absorbs only the radial force between the PTO-wheel and the main shaft wheel 4, since the support results between the main shaft wheel 4 and the plate 5 and not between the main shaft 16 and the plate 5. The main shaft 16 remains thereby free and can center itself as formerly also when the other main shaft wheels (not shown) are shifted.

Figure 2:
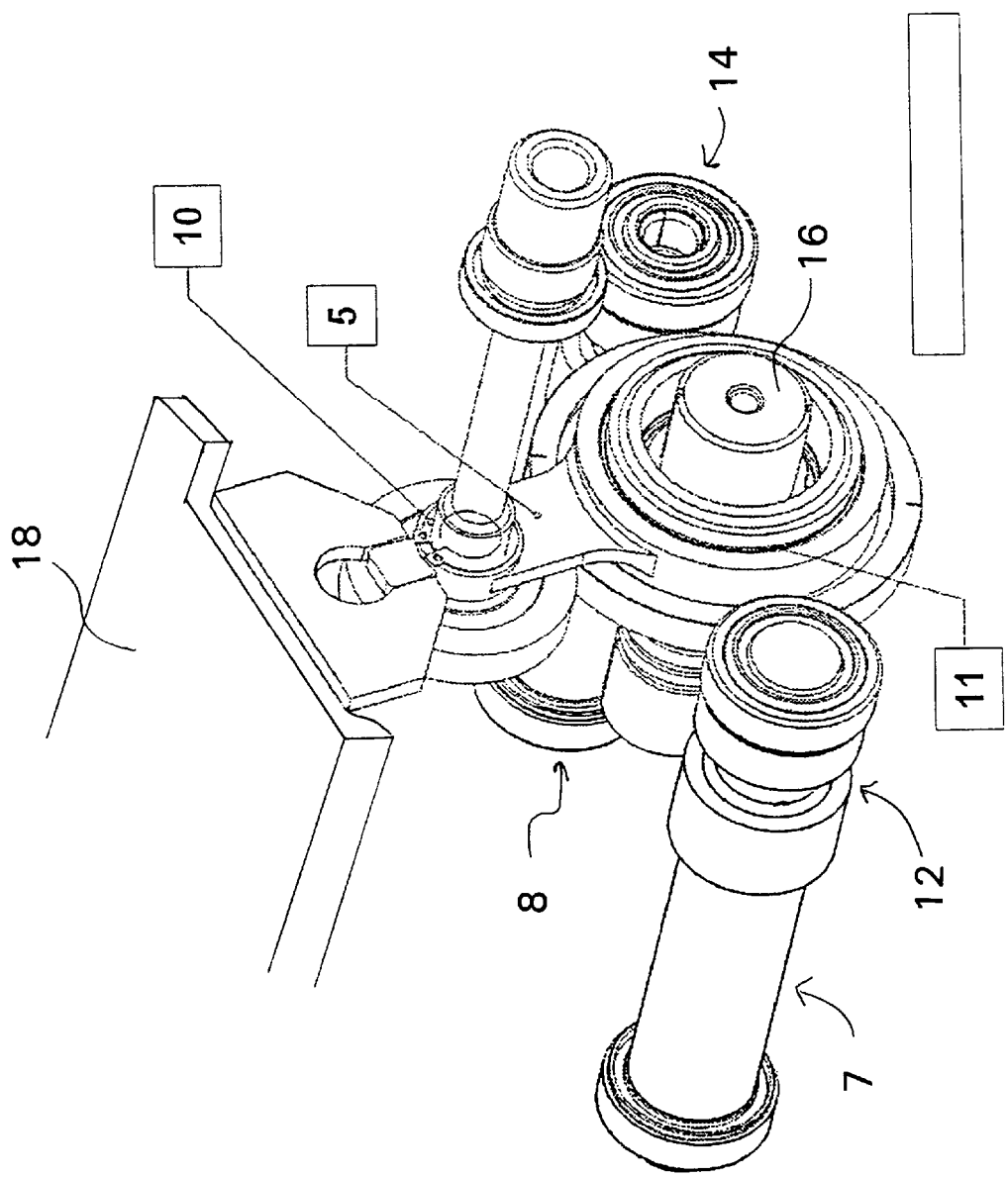
FIG. 2 shows one other perspective view of said part.
Figure 3:
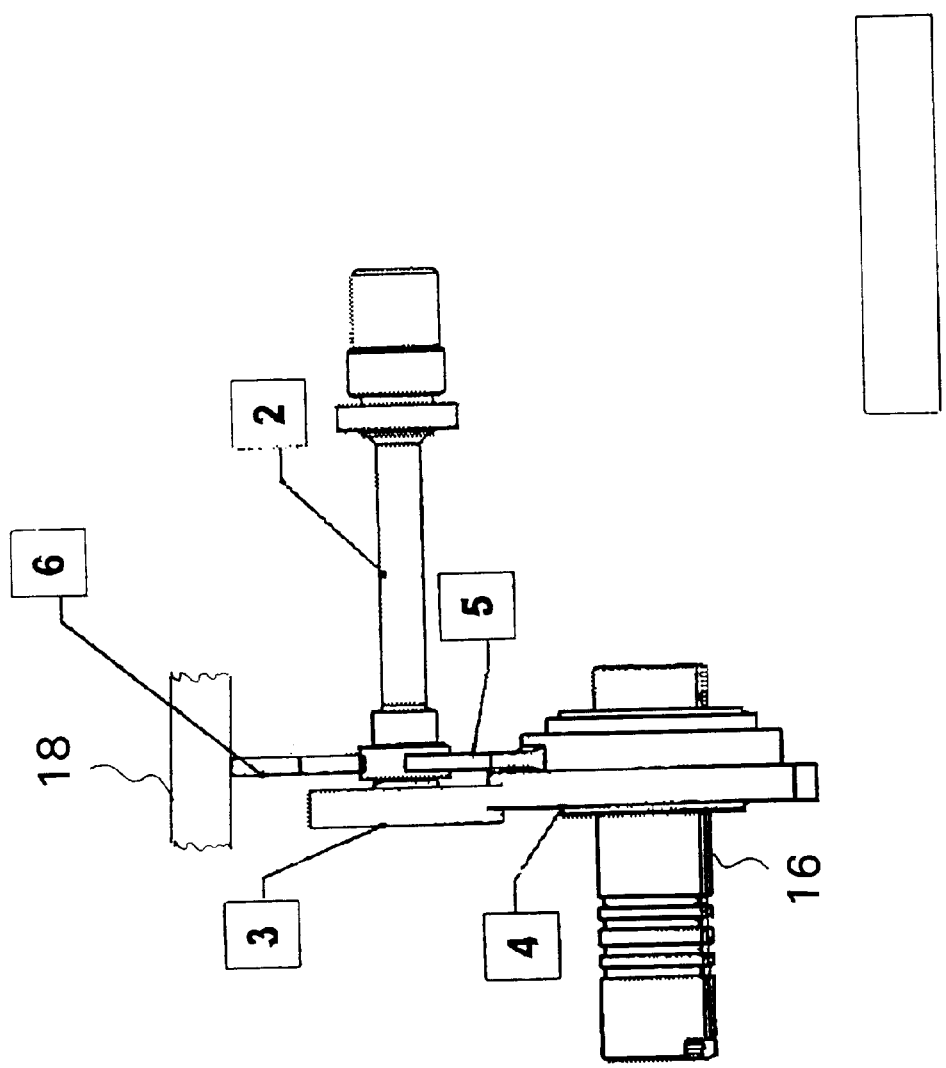
FIG. 3 shows a diagrammatic side view.

The plate 5 is additionally connected via a bracket 6 with the transmission housing 18 (diagrammatically shown in FIGS. 2 and 3) so that the component formed by the tangential force cropping up on the PTO-wheel 3 is absorbed by the bearing between the plate 5 and the PTO-shaft 2.

Besides, the PTO-shaft 2 is supported in a bearing 9 so that it can perform a wobbling motion which is also ensured by the connection of the PTO-shaft 2 in the transmission housing 18 with the shaft 1 in the PTO proper. Thereby the PTO-shaft 2 has a behavior similar to a prop shaft which transmits a torque and yet has space for clearance motion.

As already explained, PTO-shaft 2, plate 5 and main shaft wheel 4 form one unit which can move with relative freedom by virtue of the selected PTO-shaft 2 support and the brackets. The main shaft wheel 4 is thus able to center itself despite a torque reduction for the PTO between the two layshafts 7, 8.

Reference numerals

1 connection to the PTO
2 PTO-shaft
3 PTO-wheel
4 main shaft wheel
5 plate
6 bracket
7 layshaft
8 layshaft
9 PTO-shaft bearing
10 bearing between plate and PTO-shaft
11 bearing between plate and main shaft wheel

What is claimed is:

1. A dual layshaft transmission having power take-off with load compensation, comprising:

a main shaft gear wheel (4) mounted on a main shaft (16) and positioned between layshaft gear wheels (12,14) mounted on corresponding layshafts (7,8);

each layshaft (7,8) being axially parallel to and radially offset from the main shaft (16);

a power take-off gear wheel (3) mounted on a power take-off shaft (2) and engaging the main shaft gear wheel (4);

in power take-off shaft (2) being axially parallel to and radially offset from the main shaft (16); and a radial force plate (5) mounted between the power take-off shaft (2) and the main shaft gear wheel (4) as a support between the power take-off gear wheel (3) and the main shaft gear wheel (4) to absorb radial forces between the power take-off gear wheel (3) and the main shaft gear wheel (4);

whereby the main shaft gear wheel (4) is supported with respect to the power take-off shaft and the main shaft (16) is free to move to be centered between two layshafts (7,8) in compensating for load shafts.

2. The dual layshaft transmission of claim 1, further comprising:

a tangential force bracket (6) connected to a transmission housing (18) and engaging the radial force plate (5) wherein the engagement between the tangential force bracket (6) and radial force plate (5) prevents tangential motion of the radial force plate (5) while allowing radial motion of the radial force plate (5).

3. The dual layshaft transmission of claim 1, further comprising:

a power take-off shaft bearing (9) mounted in the transmission housing (18) and supporting the power take-off shaft (2) so as to allow the power take-off shaft (2) to have a wobbling movement about the axis of the power take-off shaft (2).

* * * * *